(12) United States Patent  (10) Patent No.: US 7,581,246 B2
Zahari  (45) Date of Patent: Aug. 25, 2009

(54) SYSTEM FOR SECURE COMMUNICATION

(75) Inventor: Azman Bin H J Zahari, Selangor (MY)

(73) Assignee: Entropic Technologies Pty Ltd., East Perth (AU)

( * ) Notice: Subject to any disclaimer, the term of this patent is extended or adjusted under 35 U.S.C. 154(b) by 0 days.

(21) Appl. No.: 10/551,003

(22) PCT Filed: Mar. 30, 2004

(86) PCT No.: PCT/AU2004/000388

§ 371 (c)(1),
(2), (4) Date: Apr. 3, 2006

(87) PCT Pub. No.: WO2004/088917

PCT Pub. Date: Oct. 14, 2004

(65) Prior Publication Data

US 2006/0174113 A1   Aug. 3, 2006

(30) Foreign Application Priority Data

Apr. 1, 2003  (AU)  ............................. 2003901468
Nov. 11, 2003  (AU)  ............................. 2003906194

(51) Int. Cl.
*G06F 21/00* (2006.01)
*G06K 7/01* (2006.01)
(52) U.S. Cl. .................... 726/9; 713/185; 235/382.5
(58) Field of Classification Search .............. 726/9; 235/382.5
See application file for complete search history.

(56) References Cited

U.S. PATENT DOCUMENTS

| 5,237,614 | A | * | 8/1993 | Weiss ............................ 713/159 |
| 5,313,521 | A | | 5/1994 | Torii et al. |
| 5,367,572 | A | * | 11/1994 | Weiss ............................ 713/184 |
| 5,478,994 | A | * | 12/1995 | Rahman et al. ............. 235/380 |
| 5,479,512 | A | * | 12/1995 | Weiss ............................ 380/28 |
| 5,627,355 | A | * | 5/1997 | Rahman et al. ............. 235/380 |
| 5,657,388 | A | * | 8/1997 | Weiss ............................ 713/185 |
| 5,737,422 | A | | 4/1998 | Billings |
| 5,771,291 | A | | 6/1998 | Newton et al. |
| 5,953,422 | A | | 9/1999 | Angelo et al. |
| 5,988,497 | A | * | 11/1999 | Wallace .................... 235/382.5 |
| 6,130,621 | A | * | 10/2000 | Weiss .......................... 340/5.28 |
| 6,466,780 | B1 | * | 10/2002 | Geiselman et al. ........... 455/411 |

(Continued)

FOREIGN PATENT DOCUMENTS

GB  2 338 381  12/1999

(Continued)

*Primary Examiner*—Christian LaForgia
(74) *Attorney, Agent, or Firm*—Bachman & LaPointe, P.C.

(57) ABSTRACT

A system for secure communication across a network including a personal code generator having one or more identification codes and one or more encryption codes. The identification codes and the encryption codes each change at predetermined time intervals. A code server is provided and is synchronized with the personal code generator such that the code server has information regarding the current identification codes and the current encryption codes of the personal code generator. A user transmits across the communication network, the current identification codes and data encrypted with the current encryption codes and the code server uses the information regarding the current identification codes to authenticate the user and the information about the current encryption codes to decrypt the transmitted data.

26 Claims, 4 Drawing Sheets

U.S. PATENT DOCUMENTS

| | | | | |
|---|---|---|---|---|
| 6,561,430 B2 * | 5/2003 | Ou | ................................ | 235/487 |
| 6,592,044 B1 * | 7/2003 | Wong et al. | ................... | 235/493 |
| 6,766,161 B2 * | 7/2004 | Geiselman et al. | ........... | 455/411 |
| 6,981,141 B1 * | 12/2005 | Mahne et al. | ................ | 713/165 |
| 7,127,088 B1 * | 10/2006 | Grajewski et al. | ............ | 382/124 |
| 7,178,041 B2 * | 2/2007 | Asokan et al. | ............... | 713/194 |
| 7,427,033 B1 * | 9/2008 | Roskind | ....................... | 235/492 |
| 2004/0236819 A1 * | 11/2004 | Anati et al. | .................. | 709/200 |

FOREIGN PATENT DOCUMENTS

| | | |
|---|---|---|
| WO | WO 99/46691 | 9/1999 |
| WO | WO 00/56009 | 9/2000 |

* cited by examiner

SYSTEM FOR SECURE COMMUNICATION

The present invention relates to a system for securely transmitting information across a communication network, such as the Internet.

Despite the growing number of people and organisations conducting commercial transactions over the Internet, there are still significant concerns regarding the security of such transactions that limit the potential growth of e-commerce on the Internet. While measures are available to provide various levels of security to data transmitted over the Internet, these measures generally have drawbacks in terms of the costs, ease of use and the use of computer resources to provide high levels of security. The current standard for secure network transmission is Secure Socket Layers (SSL) which uses Public Key Cryptography. Public key cryptography involves the use of a pair of keys, being a public key and a private key. Any data encrypted by one key requires the other key for decryption. This type of encryption is referred to as asymmetric encryption. In symmetric encryption, the same key is used for both encryption and decryption. Asymmetric encryption has the advantage that the sender and receiver of data do not need to have shared the encryption key prior to the communication. The owner publishes the details of the public key and keeps the details the private key secure. Others can send information encrypted with the public key to the owner knowing that only the owner can decrypt it as they alone have the private key. Also the owner can encrypt information with the private key and send this to others. If this information can be decrypted by the public key then the person who decrypts knows it came from the owner of the private key.

It is known however, that for a required encryption strength, keys of greater length are required when using asymmetric encryption in comparison to symmetric key encryption. The longer keys mean more computation and asymmetric encryption is therefore often used to simply send a known key which is then used for symmetric encryption of the data.

With regard to faceless electronic communications there are generally 4 security issues that need to be addressed. These issues are:

Authentication—A means to confirm that the user is who he says he is.

Privacy—A means to ensure that the communication is private and difficult to eavesdrop upon.

Integrity—A means to ensure that the communicated data cannot be tampered with or corrupted.

Non-repudiation—A means to ensure confirmation or authorisation of the transaction so that the user can not deny responsibility for the transaction at a later date.

Most security systems only deal with two of these issues, namely Authentication and Privacy. The last two issues are more difficult to overcome, with the latter being the most difficult. In order to deal with all four of these issues, it will generally be required to integrate various technologies which deal with specific issues, which is expensive and therefore not available to all users.

The present invention provides a system for communicating securely over a communication network, such as the Internet, which attempts to address the above mentioned issues effectively and economically.

In accordance with one aspect of the present invention there is provided a system for secure communication across a communication network comprising:

a personal code generation means having one or more identification codes and one or more encryption codes, the identification and encryption codes being arranged to change at predetermined time intervals; and a code server synchronised with the personal code generation means such that the code server has information regarding the or each current identification code and the or each current encryption code of the personal code generation means;

wherein a user transmits across the communication network, the or each current identification code of the personal code generation means and data encrypted with the or each current encryption code of the personal code generation means and the code server uses the information regarding the or each current identification code to authenticate the user and the information about the or each current encryption code to decrypt the transmitted data.

The present invention will now be described, by way of example, with reference to the accompanying drawings, in which.

Referring to the figures, there is shown a system for secure communication 10 across a communication network 14. The communication network 14 may be a publicly accessible network, such as the Internet, or a private network.

The system for secure communication 10 includes a code generation means in the form of a personal token 12. In the embodiment shown in the figures, the personal token 12 is provided in a physical form such that it is easily carried by a user. The personal token 12 may, for example, be in the form of a pendant 17 or card 18. In a further embodiment, the personal token 12 may be provided as software functioning as a virtual device on a computer terminal.

The personal token 12 is arranged to generate and/or store information including one or more identification codes 20 that are valid at any point in time and one or more encryption codes 22 that are valid at any point in time. In the embodiment shown in the drawings, the personal token 12 generates and/or stores one current identification code 20 and one current encryption code 22. The personal token may include one or more display means 24 on which the current identification code 20 and the current encryption code 22 can be displayed.

The personal token 12 is provided with a suitable processing means which is capable of changing the identification code 20 and the encryption code 22 at predetermined time intervals. The identification code 20 and encryption code 22 would change randomly. Also, the time intervals at which the changes occur may not be regular.

While the personal token 12 may be a single device which operates as described above, the function of the personal token 12 may be achieved by a combination of devices. For example, it is envisaged that a conventional 'Smartcard' and the user's terminal may act as the personal token 12. As smartcards are readily available, it may be desired to use such devices as the personal token 12. However, these devices do not have a permanent power source or a timing device and are therefore not able to perform the function of the personal token 12 alone.

In this case, the smartcard would be provided with an initialisation code for each of the identification and encryption codes, when first set up by the code server 16. The code server 16 is arranged to generate the changing identification and encryption codes by using an algorithm which is a function of the initialisation codes and a reference clock. Further, the user's computer is provided with software which is also able to generate the changing identification an encryption codes once provided with the initialisation code, using the same reference clock.

In one embodiment, the code server generates a first initialisation code and a second initialisation code for each of the identification and encryption codes when the smartcard is set up. The first initialisation codes are provided to the smartcard and both the first and second initialisation codes are stored by the code server. When the user wishes to use the system, the user's computer is provided with the first initialisation codes, which is retransmitted to the code server 16. The code server 16 in response transmits only the second initialisation codes back to the user's computer, which then uses a predefined algorithm to combine the first and second initialisation codes into the final initialisation codes. The final initialisation codes are then used as mentioned above to generate the changing identification and encryption codes.

The secure communication system 10 is also provided with one or more code servers 16 to service a plurality of personal tokens 12. The code server 16 is in the form of a suitable computer connected to the communication network 14. The code server 16 is arranged to generate and/or store information about each of the personal tokens 12 that are serviced by the code server 16, including the identification code 20 and encryption code 22. The code server 16 is arranged to be synchronised with each of the personal tokens 12 before use of the personal token 12 is commenced by the user. Following synchronisation, the code server 16 will have information about the personal token 12 such that the code server 16 is able to determine the current identification code 20 and encryption code 22 of the personal token 12 at any instant in time.

The user of the personal token 12 is also provided with a Username and/or Password associated with the personal token 12. Either a username or password or both may be provided associated with the personal token 12 but in the embodiment described, both are provided. As the identification code 20 and encryption code 22 are available to the holder of the personal token 12, loss of the personal token 12 by the user could result in a breach of security. Information regarding the username and password for the personal token 12 is stored by credit card server 28 but is not stored by the personal token 12. In this way, unauthorised use of the personal token 12 is restricted. The functions of the credit card company server 28 and the code server 16 may be integrated into a single server if required (not shown).

Figure 1:
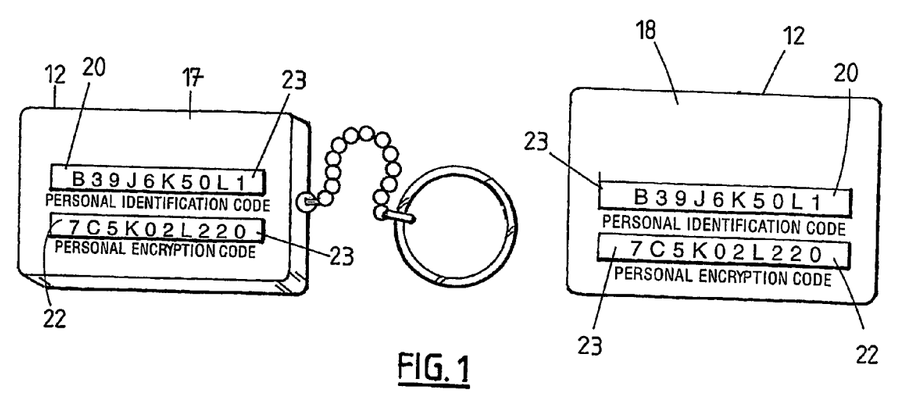
FIG. 1 is a representation of personal tokens for use with a system for secure communication in accordance with the present invention.
Figure 2:
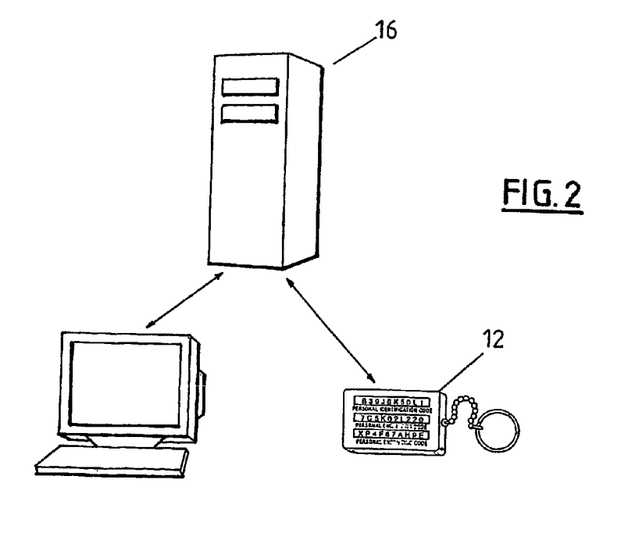
FIG. 2 is a representation of personal token and corresponding code server for use with the system for secure communication.
Figure 3:
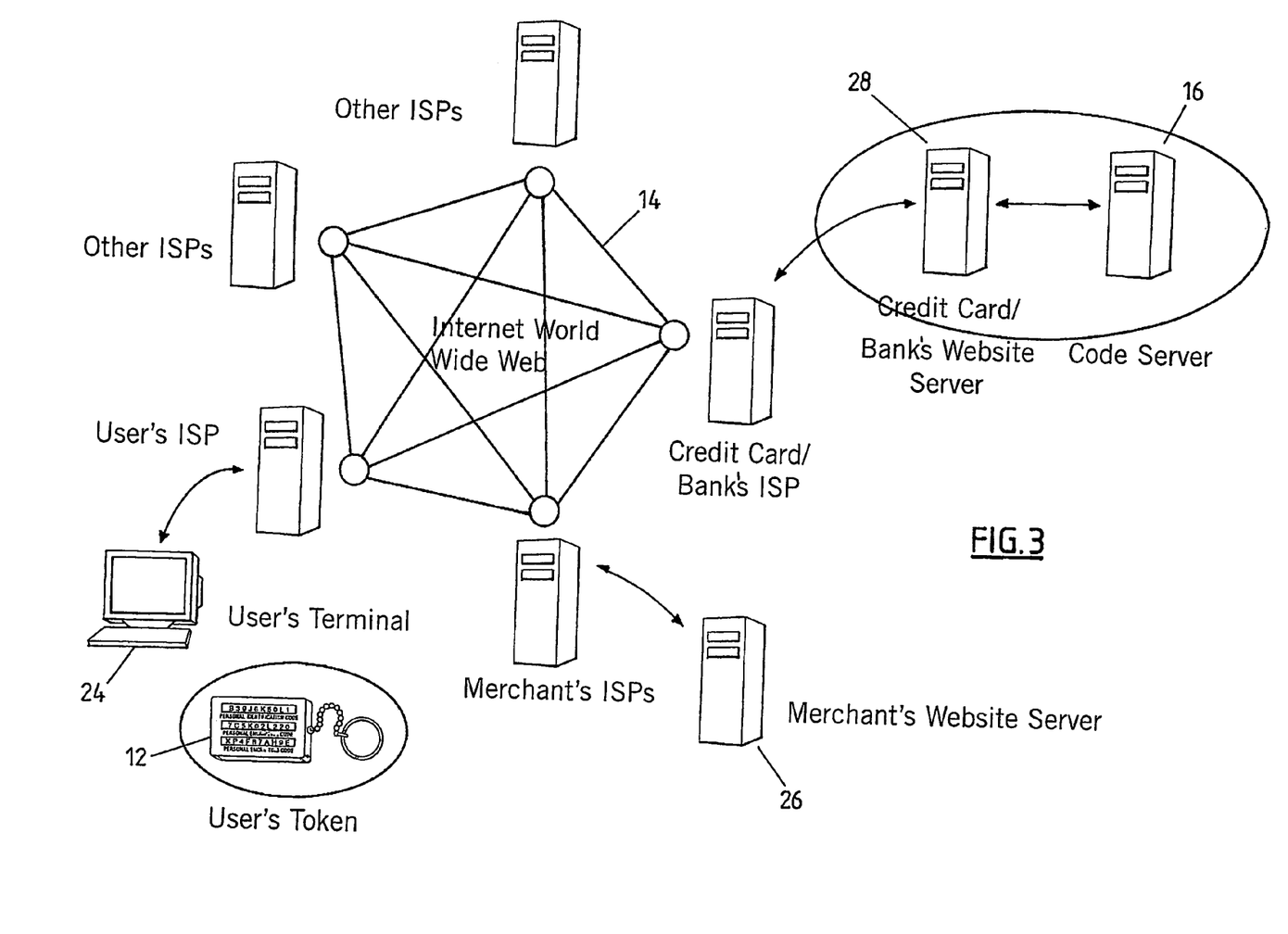
FIG. 3 is a representation of a system for secure communication in accordance with the present invention implemented on a communication network.

FIG. 3 shows an example of the system for secure communication 10 in use on a communication network 14. In this example, a user operating a user terminal 24 requires to communicate securely with a merchant's server 26 in order to make a purchase. The merchant's server 26 requires to communicate securely with a credit card company server 28 in order to determine if credit card details provided by the user are valid for the purposes of the present purchase. In the embodiment shown in FIG. 3, the credit card company has a code server 16 connected securely, for example by a private connection, to the credit card company server 28.

Each of the user terminal 24, the merchant server 26 and the Credit Card company server 28 is provided with encryption software capable of encrypting data to be transmitted over the communication network 14 using an encryption code as the key. In use, when the user wishes to transmit his credit card details to the merchant's server 26, he enters the credit card details into the user terminal 24 along with his username and password. The credit card details are then encrypted by the encryption software using the current encryption code 22 of the personal token 12 which is provided to the encryption software by the user. The encrypted information is then transmitted along with the username and password and the current identification code 20 displayed on the personal token 12 to the merchant's server 26 over the communication network 14. The current encryption code 22 is not transmitted across the communication network 14.

While in the present embodiment, the information generated and/or stored on the personal token 12 is displayed for viewing and then entered manually into the user terminal 24, the personal token 12 may be provided with a communication port (not shown) arranged to connect directly to the user terminal and provide the identification code 20 and encryption code 22 to the user terminal via the communication port.

As it is possible that the user may make an error in entering the codes if entering manually, it may be necessary in this case to perform a checking step, prior to transmission of the encrypted communication. If, for example, the user were to enter the correct identification code 20 but the wrong encryption code, the authentication of the user would be correct and transmission could proceed, however the communication would fail due to the encryption codes 22 not matching. In the above mentioned checking step, one-way hashes of the identification code 20 and the encryption code 22 would be sent to the code server 16 which would compare these values with one-way hashes of the identification and encryption codes 16 on the server. If the results differed, the code server 16 could advise the user that an error had been made. Otherwise, communication could proceed.

The merchant's server 26 receives the username and password, the current identification code 20 and the encrypted information from the user terminal 24 and re-transmits to the credit card company server 28 for validation of the username and password against the current identification code 20 and against the credit card details. The credit card company server 28, against the username and password received, requests from the code server 16 its corresponding identification code and verifies that it matches the current identification code 20 received. Following this authentication verification, the credit card company server 28 requests from the code server 16 its corresponding decryption code, which should be the same as the encryption code 22 for the time the information was encrypted and therefore be able to decrypt the information. The decrypted information, decrypted in the credit card company server 28 is compared against the valid credit card details and the merchant's server 26 is advised, via the communication network 14, whether the transaction may proceed. In the event that any of the steps of verification fail, the user will be notified via the communication network 14 that the transaction cannot proceed and may be requested to enter all the required details again.

While this example shows only transmission of information from the user to the location of the credit card company server 28 and its code server 16, information being transmitted in the opposite direction could be transmitted using the same means. That is, if information needs to be transmitted across the communication network 14 to the user from the credit card company, the identity of the credit card company is authenticated with the current identification code 20 provided by the code server 16 and the information would be encrypted with the current encryption code 22 provided by the code server 16. The user could then decrypt the information by providing the encryption code 22 from the personal token 12 to the encryption software on the user terminal 24.

Figure 4:
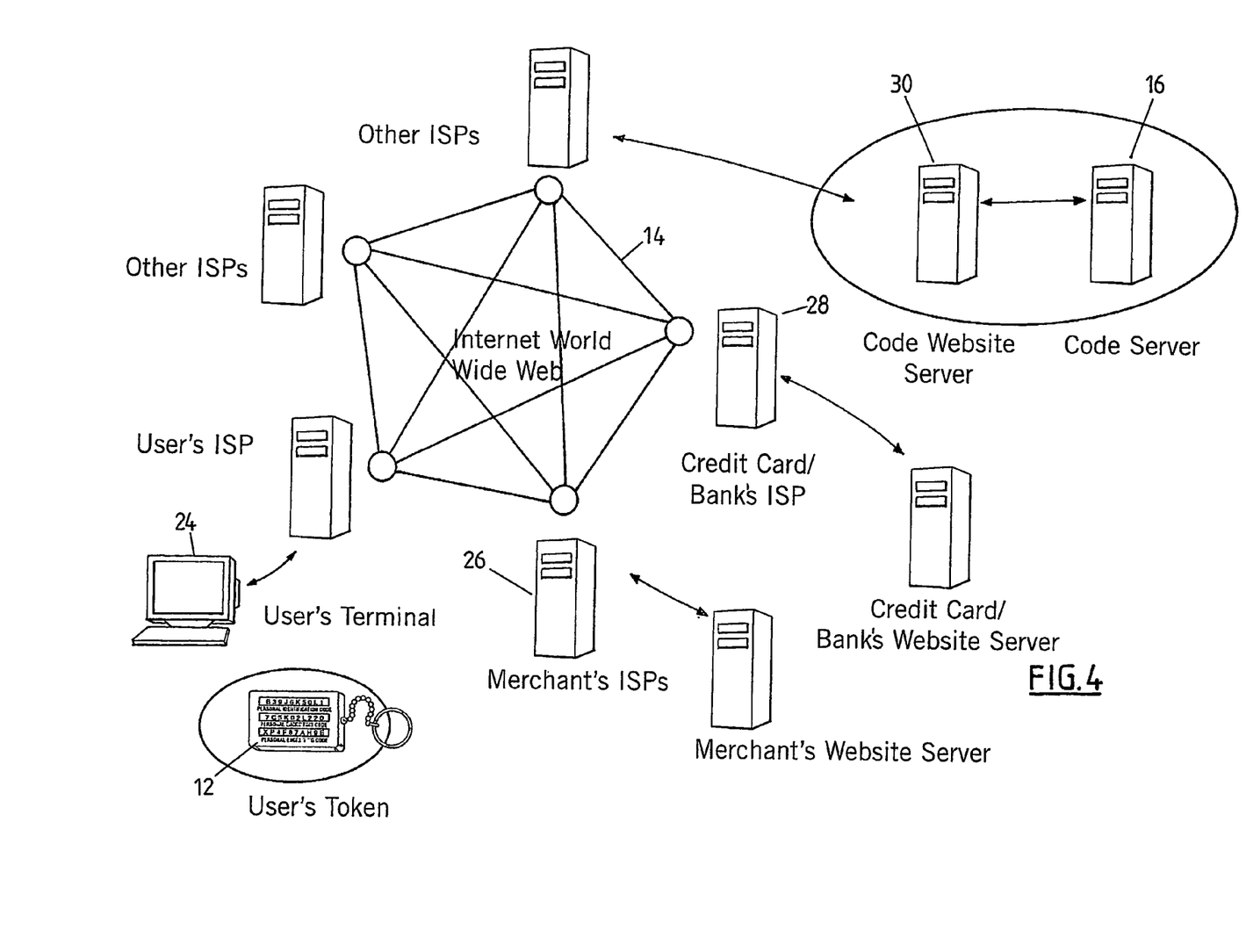
FIG. 4 is a representation of an alternative embodiment of a system for secure communication in accordance with the present invention implemented on a communication network.

FIG. 4 shows an alternative arrangement of the system for secure communication 10 shown in FIG. 3. In FIG. 4, the Credit card company does not have their own code server 16. The code server 16 is provided at another location and may communicate with the credit card company server 28 via a code network server 30 also connected to the communication network 14. It is foreseeable that some organisations may not be able to justify the expense of their own code server 16 and use an arrangement such as this. The method for communication in this case is the same as previously described with the exception of the communication between the credit card server 28 and the code server 16. In this case, as the information is not being passed over a private connection, the information passing between the credit card company server 28 and the code server 16 must also be encrypted. The credit card company in this case will possess their own personal token 12 or another form of code generation means which can be used in the same manner as described above to encrypt transmissions between the credit card company and the code server 16.

The system for secure communication 10 described will allow any two computers provided with personal tokens 12 or another form of code generation means within a network to communicate securely, in effect providing in effect multiple 'virtual private channels' within any network or communication means irrespective of the network protocol or communication means.

The system for secure communication may also be utilised in order to provided a system for secure storage of data which can be accessed across the communication network. The archiving of data is performed by the use of an archiving code. The archiving code is generated by the code server 16 when the code server 16 synchronises with the personal token 12. The archiving code is arranged to change at predetermined intervals in the same manner as the identification and encryption codes 20 and 22 but is known only to the code server 16 and not the personal token 12. The code server 16 is arranged to store also previous archiving codes used by a user.

The system for storage of data is arranged to store data in an encrypted format on a storage server on the communication network. The files which comprise the stored data are encrypted upon creation or modification using the encryption code which is current at that time. Also provided is a key archive. The key archive comprises a data file which includes details of the encrypted data files and corresponding encryption codes, so that access to the key archive allows decryption of the encrypted data files. The key archive is encrypted with the archiving code.

In use, when a user requires access to the stored data, the user communicates to the code server 16 his username, password, current identification code and a request to access the stored data, which is encrypted with the current encryption code. The code server, on verifying the user's identity, accesses the previous archiving code that was used to encrypt the user's key archive. The code server 16 then provides this to the user along with the current archiving code for that user. This information is provided using the current encryption code. Once the user has this information, their computer is able to decrypt the key archive and therefore access the stored data. The user then creates or modifies stored data as required, which is encrypted following use with encryption keys which are stored in the key archive. These actions are all performed automatically by software on the user's computer and occur preferably only in the RAM of the user's computer.

When the user has finished their current session, the key archive is encrypted again with the current archiving key which has been supplied by the code server and the key archive and encrypted data files are forwarded to the location for storage. Before ending the session, the identification and encryption and archiving codes are purged from the user's computer memory. The code server then stores the current archiving key overwriting the previous archiving key.

It will be appreciated that the key archive and the encrypted stored data may be stored together or separately. Also, it does not matter where in the communication network, the key archive or the encrypted data is stored.

Figure 5:
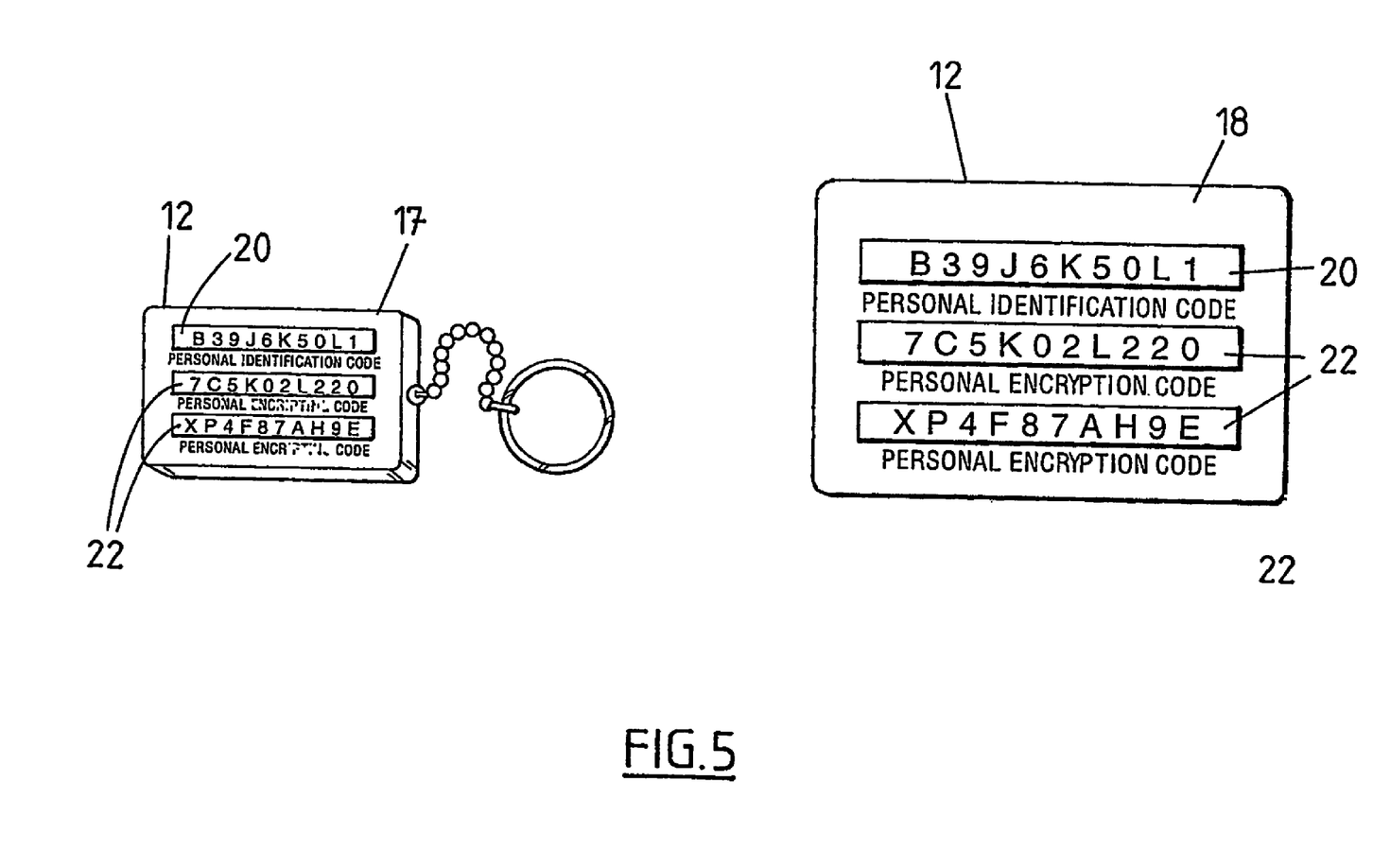
FIG. 5 is a representation of personal tokens having a plurality of encryption codes for use with the system for secure communication.

FIG. 5 shows alternative embodiments of personal tokens 12 in which a plurality of encryption codes 22 are provided on the personal token 12. In the embodiment shown, two encryption codes 22 are used. The personal token 12 of FIG. 5 may be used in a system for secure communication wherein the method of encryption of data utilises both encryption codes 22 for greater security.

Modifications and variations as would be apparent to a skilled addressee are deemed to be within the scope of the present invention.

The invention claimed is:

1. A system for secure communication across a communication network comprising:

a personal code generation means having an identification code and an encryption code, the identification code and the encryption code being arranged to change randomly at predetermined intervals of time; and a code server including the identification code and the encryption code, the code server being synchronised with the personal code generation means such that the identification code of the code server and the encryption code of the code server change independently of and in synchronisation with the identification code of the personal code generation means and the encryption code of the personal code generation means respectively, such that the code server is able to independently determine the identification code and the encryption code of the personal code generation means at any instant of time;

wherein, in use, a user transmits across the communication network, only the identification code of the personal code generation means together with data encrypted with the current encryption code of the personal code generation means and wherein the code server matches the identification code of the personal code generation means with the corresponding identification code of the code server to authenticate the user and uses the corresponding encryption code in the code server to decrypt the transmitted data.

2. A system for secure communication in accordance with claim 1, wherein the code server communicates to the user following authentication of the user by transmitting data across the communication network to the user encrypted with the encryption code of the code server and the user decrypts the data transmitted by the code server with the encryption code of the personal code generation means.

3. A system for secure communication in accordance with claim 1, wherein the code server stores information including a username assigned to the owner of the personal code generation means and the username is transmitted across the communication network with the identification code of the personal code generation means and the data encrypted with the encryption code of the personal code generation means and the code server uses the username to authenticate the user as the owner of the personal code generation means.

4. A system for secure communication in accordance with claim 1, wherein the code server stores information including a password assigned to the owner of the personal code generation means and the password is transmitted across the communication network with the identification code of the personal code generation means and the data encrypted with the encryption code of the personal code generation means and the code server uses the password to authenticate the user as the owner of the personal code generation means.

5. A system for secure communication in accordance with claim 1, wherein the personal code generation means comprises a personal portable token.

6. A system for secure communication in accordance with claim 5, wherein the personal portable token is a pendant.

7. A system for secure communication in accordance with claim 5, wherein the personal portable token is a card.

8. A system for secure communication in accordance with claim 5, wherein the personal code generation means includes a communication port to communicate the identification code of the personal code generation means and the current encryption code of the personal code generation means to a user's computer.

9. A system for secure communication in accordance with claim 5, wherein the personal code generation means includes a display means, the display means displaying the identification code of the personal code generation means and the encryption code of the personal code generation means.

10. A system for secure communication in accordance with claim 5, wherein the personal code generation means comprises a smart card having an initialisation code known to the code server and software residing on a user's computer, the software being capable of generating the identification code and each encryption code based on the initialisation code and a reference clock, the code server also being capable of generating the identification code and the encryption code based on the initialisation code and the reference clock.

11. A system for secure communication in accordance with claim 1, wherein the personal code generation means comprises software residing on a user's computer.

12. A system for secure communication in accordance with claim 1, wherein the identification code is one of a plurality of identification codes.

13. A system for secure communication in accordance with claim 1, wherein the encryption code is one of a plurality of encryption codes.

14. A system for securely accessing data stored in an encrypted form on a storage means accessible by a communication network comprising:
  a personal code generation means having an identification code and an encryption code, the identification and the encryption code being arranged to change randomly at predetermined intervals of time;
  a key archive associated with the personal code generation means and with one or more data files on the storage means, the key archive having information including the location of the data files and the encryption codes with which each of the data files is encrypted, the key archive being encrypted with an archiving code; and
  a code server including the identification code and the encryption code, the code server being synchronised with the personal code generation means such that the identification code of the code server and the encryption code of the server change independently of and in synchronisation with the identification code of the personal code generation means and the encryption code of the personal code generation means, the code server also having a previous archiving code being the archiving code last used to encrypt the key archive and a current archiving code being arranged to change with time;
  wherein when a user wishes to access each stored data file, the user transmits across the communication network, only the identification code of the personal code generation means and data including a request to access the stored data files encrypted with the encryption code of the personal code generation means and wherein the code server matches the identification code of the personal code generation means with the corresponding identification code of the code server to authenticate the user and uses the corresponding encryption code of the code server to decrypt the transmitted data and wherein the code server communicates to the user the previous archiving code in encrypted form using the encryption code in the code server so that the user may decrypt the key archive providing access to the stored data files.

15. A system for securely accessing data stored in accordance with claim 14, wherein when the code server transmits to the user the previous archiving code, the code server also transmits the current archiving code and the user then uses the current archiving code to encrypt the key archive when the user has completed accessing the stored data files and the code server stores the current archiving code as the previous archiving code for future access to the store data files.

16. A system for securely accessing stored data in accordance with claim 14, wherein the identification code is one of a plurality of identification codes.

17. A system for securely accessing stored data in accordance with claim 14, wherein the encryption code is one of a plurality of encryption codes.

18. A method for securely communicating across a communication network comprising the steps of:
  providing a personal code generation means to a user, the personal code generation means having an identification code and an encryption code, the identification code and the encryption code being arranged to change randomly at predetermined intervals of time; and
  providing a code server including the identification code and the encryption code and synchronising the code server with the personal code generation means such that the identification code of the code server and the encryption code of the code server change independently of and in synchronisation with the identification code of the personal code generation means and the encryption code of the personal code generation means respectively, such that the code server is able to independently determine the identification code and the encryption code of the personal code generation means at any instant of time; and
  the user transmitting across the communication network, only the identification code of the personal code generation means and data encrypted with the encryption code of the personal code generation means and wherein the code server matches the identification code of the personal code generation means with the corresponding identification code of the code server to authenticate the user and uses the corresponding encryption code in the code server to decrypt the transmitted data.

19. A method for securely communicating across a communication network in accordance with claim 18 further comprising the step of the code server communicating to the user following authentication of the user by transmitting data across the communication network to the user encrypted with the encryption code of the code server and the user decrypting the data transmitted by the code server with the encryption code of the personal code generation means.

20. A method for securely communicating across a communication network in accordance with claim 18, further comprising the steps of providing the user with a username and password known to the code server and transmitting the username and password across the communication network with the identification code of the personal code generation means and the data encrypted with the encryption code of the personal code generation means and the code server using the username and password to authenticate the user of the personal code generation means.

21. A method for securely communicating across a communication network in accordance with claim 18, wherein the identification code is one of a plurality of identification codes.

22. A method for securely communicating across a communication network in accordance with claim 18, wherein the encryption code is one of a plurality of encryption codes.

23. A method for securely accessing data stored in an encrypted form on a storage means accessible by a communication network comprising the steps of:

providing a personal code generation means having an identification code and an encryption code, the identification and the encryption code being arranged to change randomly at predetermined intervals of time;

providing a key archive associated with the personal code generation means and with one or more data files on the storage means, the key archive having information including the location of the data files and encryption keys with which each of the data files is encrypted, the key archive being encrypted with an archiving code; and synchronising the code server with the personal code generation means such that identification code of the code server and the encryption code of the code server change independently of and in synchronisation with the identification code of the personal code generation means and the encryption code of the personal code generation means respectively, such that the code server is able to independently determine the identification code and the encryption code of the personal code generation means at any instant of time, the code server also having a previous archiving code being the archiving code last used to encrypt the key archive and a current archiving code being arranged to change at predetermined time intervals;

the user transmitting across the communication network, only the identification code of the personal code generation means and data including a request to access the stored data files encrypted with the encryption code of the personal code generation means;

wherein the code server matches the identification code of the personal code generation means with the corresponding identification code of the code server to authenticate the user and uses the corresponding encryption code in the code server to decrypt the transmitted data and wherein the code server communicates to the user the previous archiving code in encrypted form so that the user may decrypt the key archive providing access to the stored data files.

24. A method for securely accessing data stored in an encrypted form on a storage means accessible by a communication network in accordance with claim 23, further comprising the steps of:

the user using the current archiving code to encrypt the key archive on completing accessing the stored data files; and the code server storing the current archiving code as the previous archiving code for future access to the store data files.

25. A method for securely accessing data stored in an encrypted form on a storage means accessible by a communication network in accordance with claim 23, wherein the identification code is one of a plurality of identification codes.

26. A method for securely accessing data stored in an encrypted form on a storage means accessible by a communication network in accordance with claim 23, wherein the encryption code is one of a plurality of encryption codes.

* * * * *